United States Patent
Momose et al.

(10) Patent No.: US 6,917,469 B2
(45) Date of Patent: Jul. 12, 2005

(54) LIGHT DIFFUSING LAMINATED PLATE

(75) Inventors: Yoshiaki Momose, Utsunomiya (JP); Kimio Itou, Kanuma (JP); Mitsuhiro Akiyama, Utsunomiya (JP); Takashi Hanne, Kanuma (JP)

(73) Assignee: Japan Acryace Co., Ltd. (JP)

( * ) Notice: Subject to any disclaimer, the term of this patent is extended or adjusted under 35 U.S.C. 154(b) by 0 days.

(21) Appl. No.: 10/874,323

(22) Filed: Jun. 24, 2004

(65) Prior Publication Data

US 2004/0263966 A1 Dec. 30, 2004

(30) Foreign Application Priority Data

Jun. 27, 2003 (JP) ........................................ 2003-185847

(51) Int. Cl.[7] .............................................. G03B 21/60
(52) U.S. Cl. ...................................... 359/453; 359/457
(58) Field of Search ................................ 359/452, 453, 359/455–457, 615

(56) References Cited

U.S. PATENT DOCUMENTS

| | | | | |
|---|---|---|---|---|
| 2,906,169 A | * | 9/1959 | Saffir ........................... | 359/452 |
| 4,773,731 A | * | 9/1988 | Goldenberg et al. ........ | 359/457 |
| 5,196,960 A | * | 3/1993 | Matsuzaki et al. .......... | 359/453 |
| 5,457,572 A | * | 10/1995 | Ishii et al. .................. | 359/457 |
| 6,502,942 B2 | * | 1/2003 | Mori et al. .................. | 359/453 |
| 6,760,155 B2 | * | 7/2004 | Murayama et al. ......... | 359/453 |
| 2004/0061935 A1 | * | 4/2004 | Ohsako et al. ............. | 359/452 |

* cited by examiner

*Primary Examiner*—Christopher Mahoney
(74) *Attorney, Agent, or Firm*—Lorusso & Loud

(57) ABSTRACT

A light diffusing laminated plate including a first light diffusing layer containing particles of a transparent light diffusing material dispersed therein and having a concave cross-section, and a second light diffusing layer containing particles of an opaque light diffusing material dispersed therein and having a convex cross-section. The first and second light diffusing layers are laminated together such that the convex and concave surfaces are face to face contact with each other to form a curved interface therebetween. The first and second light diffusing layers have a substantially uniform cross-section in one direction. A transmissive screen for a rear projection display device having a light image source, including the above light diffusing laminated plate and a lens system disposed such that a light image from the source is projected through the light diffusing laminated plate and the lens system and displayed on the screen.

11 Claims, 15 Drawing Sheets

Luminance Distribution for P

Luminance Distribution for Q

LIGHT DIFFUSING LAMINATED PLATE

CROSS-REFERENCE TO RELATED APPLICATION

This application claims, under 35 USC 119, priorities of Japanese Patent Application No. 2003-185847, filed Jun. 27, 2003, disclosures of which, inclusive of the specification, claims and drawings, are hereby incorporated by reference herein.

BACKGROUND OF THE INVENTION

Field of the Invention

This invention relates to a transmissive screen for use in a rear projection display device such as a rear projection television and to a light diffusing plate for use in such a transmissive screen.

A rear projection television generally uses a transmissive screen having a Fresnel lens, a lenticular lens and a light diffusing plate containing particles of a light diffusing material dispersed therein. The Fresnel lens serves to collect light projected from a light source and to direct it toward a viewer. The lenticular lens serves to distribute light within a region where the viewer can see and to use light effectively. The light diffusing plate has a function of diffusing projected light to produce clear images.

In general, a rear projection television is required to have a wider viewing angle horizontally than vertically. Thus, a transmissive screen for use in a projection television has a light diffusing plate having a viewer side surface on which a lenticular lens for horizontal diffusion is laminated.

The horizontal viewing angle of a transmissive screen depends mainly on the performance of the lenticular lens for horizontal diffusion, The vertical viewing angle of a transmissive screen is determined by a light diffusing material contained in the light diffusing plate. The vertical viewing angle determined by the light diffusing material is much narrower than the horizontal viewing angle determined by a lenticular lens for horizontal diffusion. Thus, the conventional rear projection display device has a problem, because luminance uniformity of the screen cannot be satisfactorily achieved and a shading phenomenon explained below is apt to occur.

As shown in FIG. 11(a), when light from a light image source 102 is projected on a screen 101 and when viewers P and Q see the screen 101, the luminance distribution on the screen 101 for the viewers P and Q are as shown in FIG. 11(b) and FIG. 11(c), respectively.

Namely, when the viewer P, who is in right front of the screen 101, sees the screen 101, the bottom area A and the top area C of the screen 101 has lower luminance and look darker to the viewer P than the middle area B thereof does as shown in FIG. 11(b) since the bottom area A and the top area C of the screen 101 are farther away from the viewer P than the middle area B is. When the viewer Q, who is not in right front of the screen 101, sees the screen 101, the top area C of the screen 101, which is closest to the viewer Q, has highest luminance and looks brightest to the viewer Q, and the areas of the screen 101 which are farther away from the viewer Q have lower luminance and look darker to the viewer Q. Especially, since the light diffusion angle of the screen 101 is small in the vertical direction, a shading phenomenon is likely to occur, i.e. luminance uniformity tends to be insufficient in the bottom area A of the screen.

To cope with the shading problem, a light diffusing plate having a lenticular lens or a Fresnel lens in which the light diffusing ability of the top and bottom areas is higher than that of the middle area has been proposed. For example, JP-A-H07-134338 discloses a screen using a lenticular lens for horizontal diffusion and/or a lenticular lens for vertical diffusion in which the diffusion angle of the lens units in the peripheral area is larger than the diffusion angle of the lens units in the center area. JP-A-H08-334837 discloses a screen using a light diffusing plate having a surface in which a lenticular lens for vertical diffusion is directly formed. The heights of the lens units of the lenticular lens and the intervals therebetween are adjusted so that the light diffusing ability of the top and bottom areas of the screen can be higher than that of the middle area thereof. JP-A-2001-228548 discloses a screen using a light diffusing plate having a light diffusing layer which is thicker at the top and bottom than at the middle so that the light diffusion angle at the top and bottom areas of the screen can be larger than that at the middle area thereof.

In the screens disclosed in JP-A-H07-134338 and JP-A-H08-334837, the peripheral area of the lenticular lens has a surface shape which is different from that of the middle area thereof so that the light diffusing ability of the peripheral area of the screen can be enhanced. To produce a lenticular lens of desired size and shape, the surface shape of the lens must be precisely controlled. It is, however, difficult to design and produce a carving roll or a mold for producing such a lens. Thus, it is difficult to produce such a lens stably.

When the thickness of the top and bottom of a light diffusing layer is increased to enhance the light diffusing ability of the top and bottom areas of a screen so that the vertical viewing angle of the screen can be widened as disclosed in JP-A-2001-228548, the following problem occurs. Thus, when a light diffusing material with a low light transmittance is used and the light diffusing layer is formed such that the top and bottom areas of the light diffusing layer have sufficient light diffusing ability, the top and bottom areas of the light diffusing layer have such a low light transmittance and a low luminance that a shading phenomenon occurs in the top and bottom areas of the screen. When a light diffusing material with a high light transmittance is used and the light diffusing layer is formed such that the top and bottom areas of the light diffusing layer have sufficient light diffusing ability, the middle area of the light diffusing layer becomes thin. Then, the middle area of the screen has an excessively high luminance, and a scintillation phenomenon (glare of the screen) or a hot band phenomenon (a phenomenon in which a significantly bright area appears on the screen) occurs in the middle area of the screen.

Thus, with the prior art screens, the light diffusing ability of the both end areas of a light diffusing plate in the vertical or horizontal direction cannot be made higher than that of the middle area thereof without decreasing the light transmittance of the both ends areas of the light diffusing plate or without excessively increasing the light transmittance of the middle area thereof.

SUMMARY OF THE INVENTION

It is an object of this invention to overcome the drawbacks of the prior arts.

Another object of this invention is to provide a transmissive screen which is free from a shading phenomenon in both end areas and hardly develop a scintillation phenomenon and a hot band phenomenon, and which has sufficient luminance uniformity.

It is a further object of this invention is to provide a light diffusing laminated plate which can be suitably used in the transmissive screen.

In accomplishing the foregoing objects, there is provided in accordance with one aspect of the present invention a light diffusing laminated plate, comprising:

a first light diffusing layer of a light transmissive resin containing particles of a transparent light diffusing material dispersed therein, the first light diffusing layer having a substantially uniform cross-section in one direction and a first surface concave in the cross-section; and a second light diffusing layer of a light transmissive resin containing particles of an opaque light diffusing material dispersed therein, the second light diffusing layer having a substantially uniform cross-section in one direction and a first surface convex in the cross-section and coinciding with the first surface of the first light diffusing layer, wherein the first and second light diffusing layers are laminated together such that the first surface of the first light diffusing layer is in face to face contact with the first surface of the second light diffusing layer to form a curved interface therebetween.

In another aspect, the present invention provides a transmissive screen for a rear projection display device having a light image source, comprising a light diffusing laminated plate described above and a lens system disposed such that a light image from the source is projected through the light diffusing laminated plate and the lens system and displayed on the screen.

According to this invention, it is possible to make the light diffusing ability of the both end areas of a light diffusing plate in the vertical or horizontal direction higher than that of the middle area thereof without decreasing the light transmittance of the both ends areas of the light diffusing plate.

Thus, a shading phenomenon in the both end areas of the screen in the vertical or horizontal direction can be prevented. Also, a scintillation phenomenon which appears in a transmissive screen of a television having a CRT light source or an LCD light source and a hot band phenomenon which appears in the middle area of a transmissive screen of a television having a CRT light source can be prevented. Thus, the transmissive screen according to this invention has good luminance uniformity. As a result, a rear projection display device such as a rear projection television using the transmissive screen of this invention has a wide viewing angle and excellent image reproducibility.

BRIEF DESCRIPTION OF THE DRAWINGS

Other objects, features and advantages of the present invention will become apparent from the detailed description of the preferred embodiments of the invention which follows, when considered in light of the accompanying drawings, in which.

DETAILED DESCRIPTION OF THE PREFERRED EMBODIMENTS OF THE INVENTION

Figure 1:
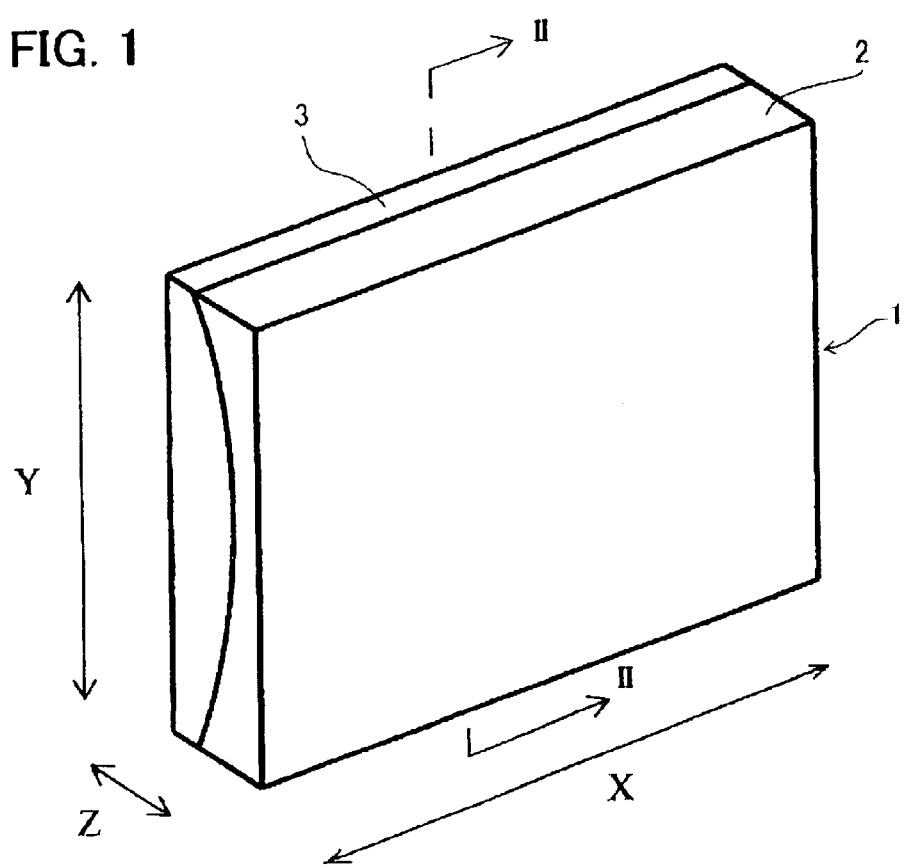
FIG. 1 is a perspective view illustrating a light diffusing laminated plate according to one embodiment of this invention.
Figure 2:
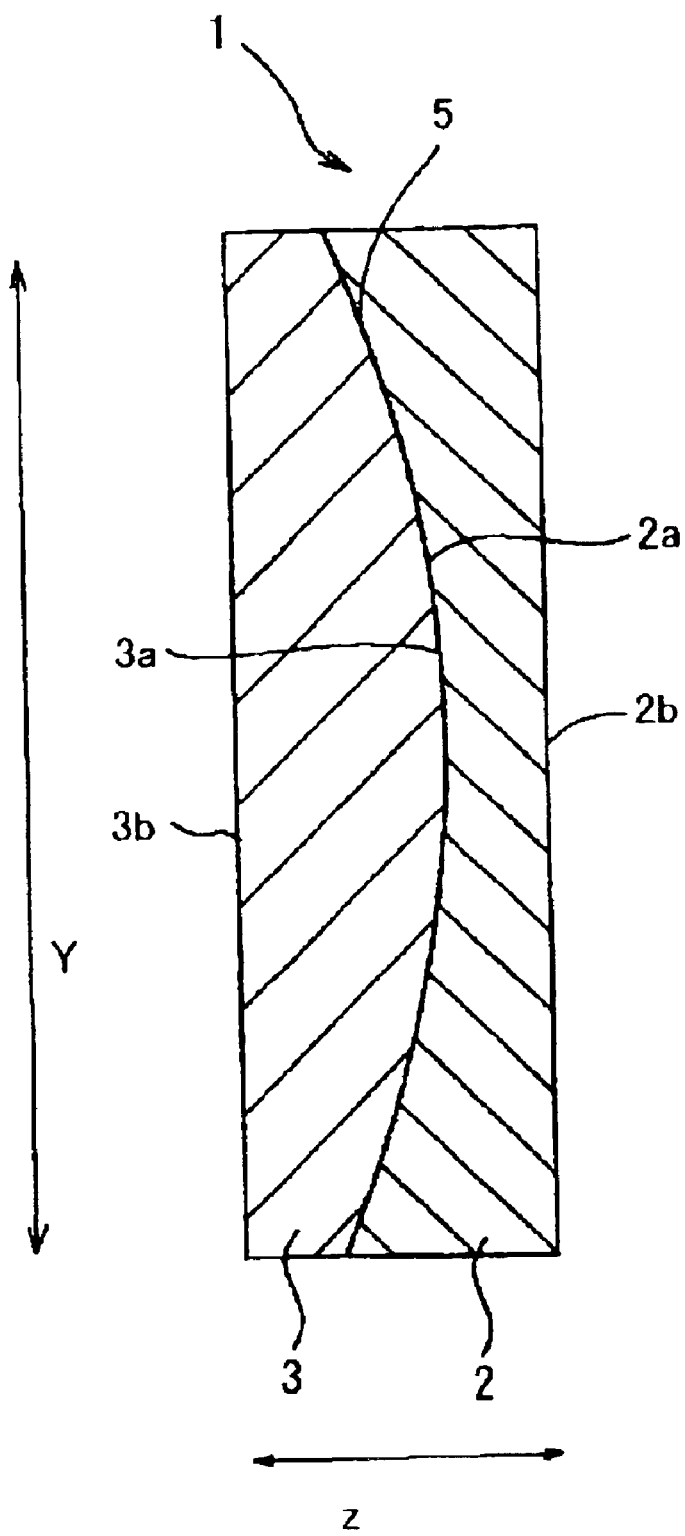
FIG. 2 is a cross-sectional view taken along the line II—II in FIG. 1.

Referring to FIGS. 1 and 2, generally designated as 1 is a light diffusing laminated plate of this invention. The light diffusing laminated plate 1 has a first light diffusing layer 2 of a light transmissive resin containing particles of a transparent light diffusing material dispersed therein, and a second light diffusing layer 3 of a light transmissive resin containing particles of an opaque light diffusing material dispersed therein.

When the width, height and thickness of the light diffusing laminated plate 1 are along the X-axis, Y-axis and Z-axis, respectively, as shown in FIG. 1, the first light diffusing layer 2 has a substantially uniform cross-section in one direction, that is, the X-axis direction. The first light diffusing layer 2 has a first surface 2$a$ which is concave in the cross-section and a second surface 2$b$ which is flat in the cross-section. In other words, the thickness of the first light diffusing layer 2 continuously increases from the middle to top and bottom in the cross-section.

The second light diffusing layer 3 also has a substantially uniform cross-section in the X-axis direction. The second light diffusing layer 3 has a first surface 3$a$ which is convex in the cross-section and a second surface 3$b$ which is flat in the cross-section. In other words, the thickness of the second light diffusing layer 3 continuously decreases from the middle to top and bottom in the cross-section.

The first surface 3a of the second light diffusing layer 3 coincides with the first surface 2a of the first light diffusing layer 2, and the first and second light diffusing layers 2 and 3 are laminated together such that the first surface 2a of the first light diffusing layer 2 is in face to face contact with the first surface 3a of the second light diffusing layer 3 to form a curved interface 5 therebetween. The thickness of the light diffusing laminated plate 1 is generally substantially constant.

The particles of the transparent light diffusing material and the particles of the opaque light diffusing material are uniformly dispersed in the first and second light diffusing layers 2 and 3, respectively. Thus, in light diffusing laminated plate 1, the amount of the transparent light diffusing material in the thickness direction (that is, the Z-axis direction) is greater in the top and bottom areas than in the middle area, whereas the amount of the opaque light diffusing material in the thickness direction is greater in the middle area than in the top and bottom areas. Therefore, the light diffusing ability of the top and bottom parts of the light diffusing plate 1 is improved without decreasing the light transmittance thereof.

The differences between a transparent light diffusing material and an opaque light diffusing material will be described with reference to FIGS. 14 and 15.

Figure 14:
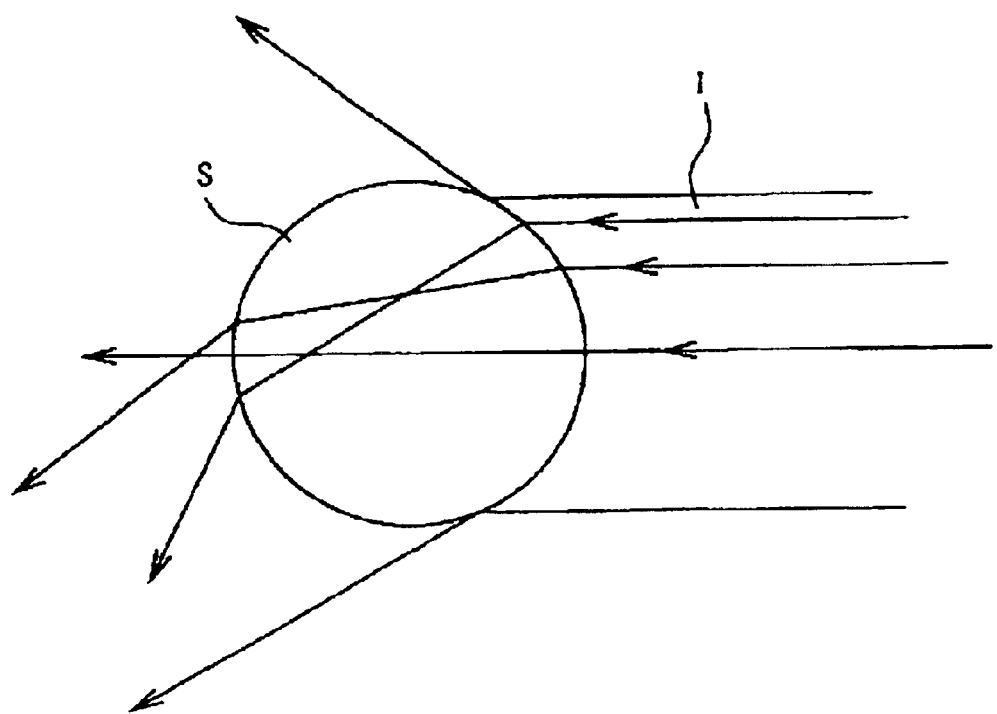
FIG. 14 is a schematic view illustrating the manner in which incident light is diffused by a transparent light diffusing material.
Figure 15:
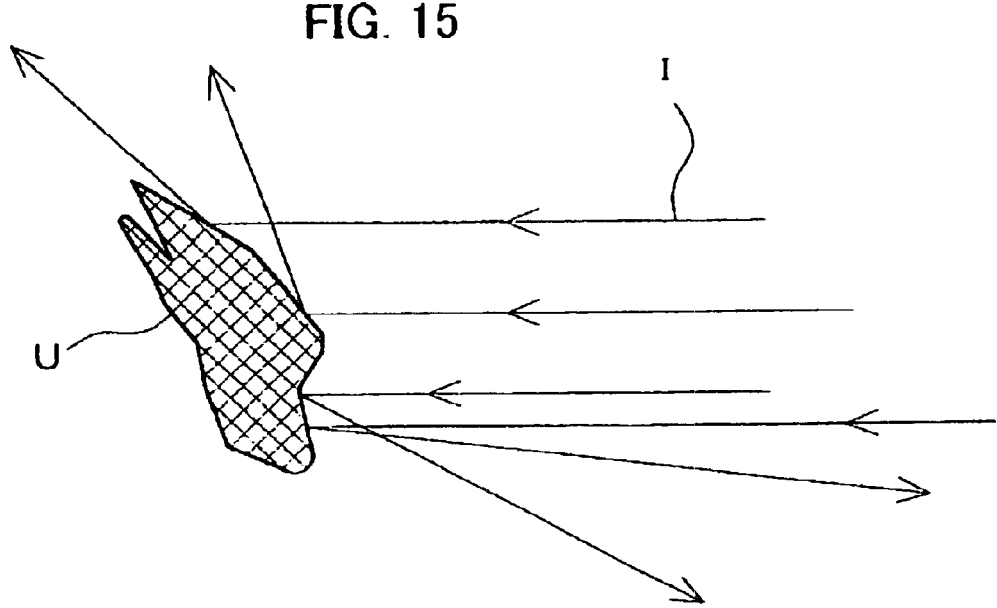
FIG. 15 is a schematic view illustrating the manner in which incident light is diffused by an opaque light diffusing material.

When a transparent light diffusing material S is dispersed in a matrix material, incident light I composed of parallel rays is diffused while traveling through the particles of the transparent light diffusing material S as shown in FIG. 14. On the other hand, when an opaque light diffusing material U is dispersed in a matrix material, incident light I is reflected on the surfaces of the particles of the opaque light diffusing material U and diffused as shown in FIG. 15. Thus, the total light transmittance of a matrix material containing an opaque light diffusing material is much lower than that of a matrix material containing a transparent light diffusing material.

When a transparent light diffusing material is dispersed in a light diffusing plate of a transmissive screen, it can produce a light diffusing effect without decreasing the total light transmittance of the transmissive screen. However, a transparent light diffusing material is likely to cause a hot band phenomenon and a scintillation phenomenon since it hardly decreases the total light transmittance. When an opaque light diffusing material is dispersed in a light diffusing plate of a transmissive screen, even in a smaller amount than a transparent light diffusing material, it can prevent a scintillation phenomenon and a hot band phenomenon and improve the light diffusing effect. However, an opaque light diffusing material can significantly decrease the total light transmittance of the transmissive screen and cause a shading phenomenon. Thus, an opaque light diffusing material cannot be added in a larger amount than a transparent light diffusing material can.

In this invention, the advantages of a transparent light diffusing material and an opaque light diffusing material are utilized to obtain a light diffusing laminated plate in which the light diffusing ability at the both end areas in the vertical or horizontal direction is higher than that in the middle area and, therefore, the light transmittance at the both end areas is not significantly lower than that at the middle area.

The light transmissive resins which serve as matrix resins for the first and second light diffusing layers 2 and 3 may be the same or different, but are preferably the same.

Figure 3:
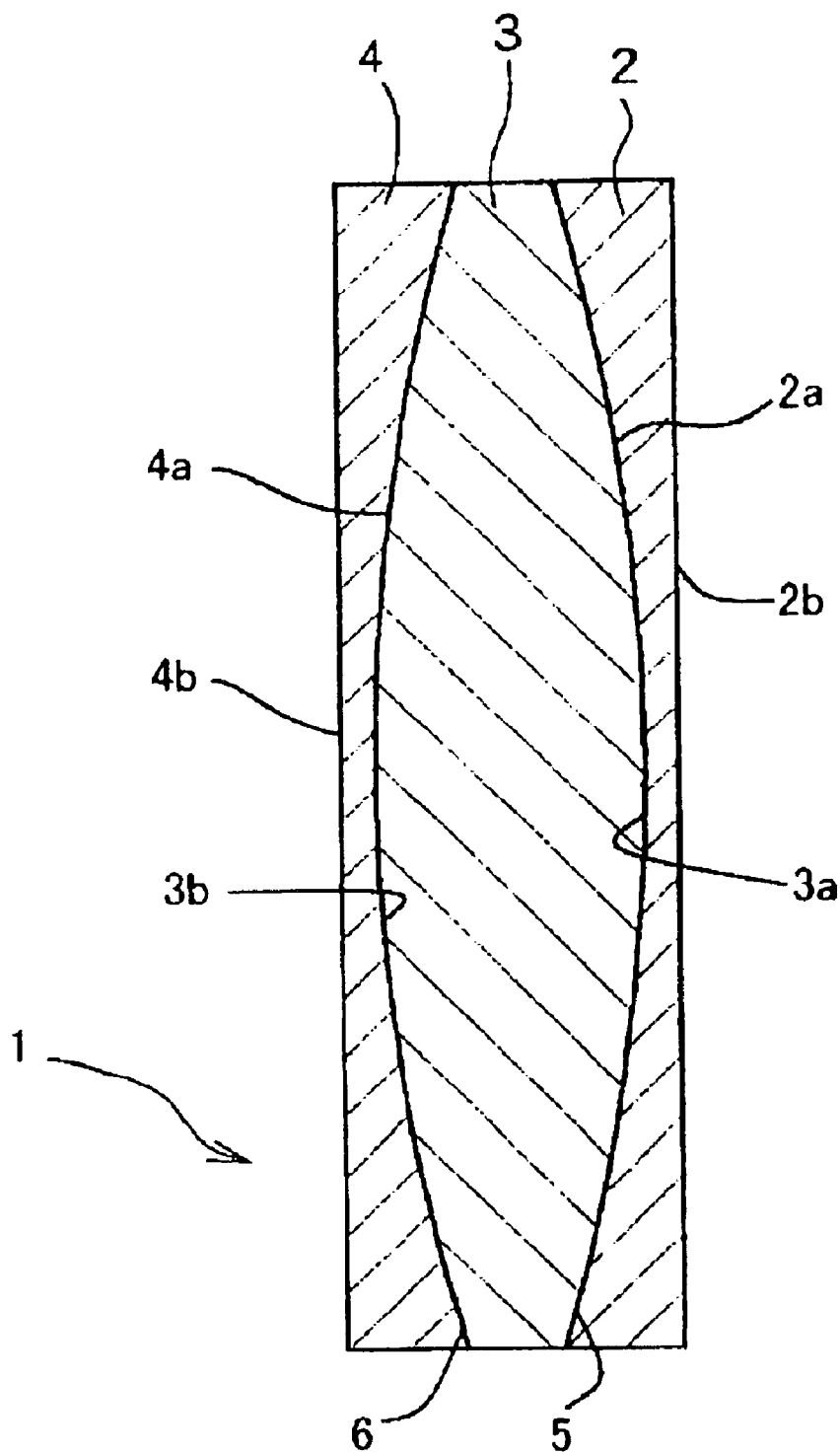
FIG. 3 is a cross-sectional view illustrating a light diffusing laminated plate according to another embodiment of this invention.

FIG. 3 is a cross-sectional view illustrating a light diffusing laminated plate according to a second embodiment of this invention. Those parts corresponding to the components of FIG. 2 are identified with the same numerals and their description will not be repeated. The light diffusing laminated plate 1 has a third light diffusing layer 4 of a light transmissive resin containing particles of a transparent light diffusing material dispersed therein in addition to the first and second light diffusing layers 2 and 3. The third light diffusing layer 4 has a substantially uniform cross-section in one direction, that is, the X-axis direction. The third light diffusing layer 4 has a first surface 4a which is concave in the cross-section and a second surface 4b which is flat in the cross-section. In this embodiment, the second surface 3b of the second light diffusing layer 3 is convex in the cross-section and coincides with the first surface 4a of the third light diffusing layer 4. The second and third light diffusing layers 3 and 4 are laminated together such that the first surface 4a of the third light diffusing layer 4 is in face to face contact with the second surface 3b of the second light diffusing layer 3 to form a curved interface 6 therebetween. The matrix resin and the transparent light diffusing material for the third light diffusing layer 4 may not be necessarily the same as those for the first light diffusing layer 2. Also, the curvatures of the interfaces 5 and 6 may not be necessarily the same.

Figure 4:
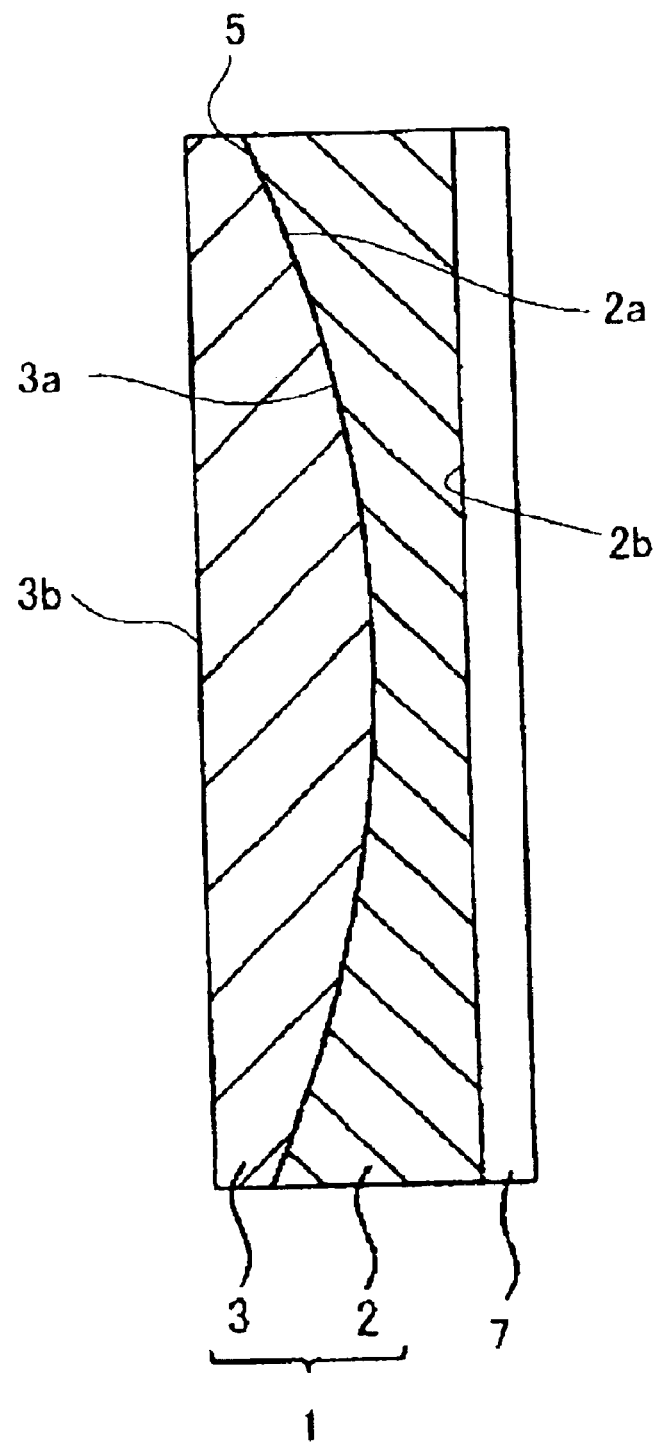
FIG. 4 is a cross-sectional view illustrating a light diffusing laminated plate according to a further embodiment of this invention.
Figure 6:
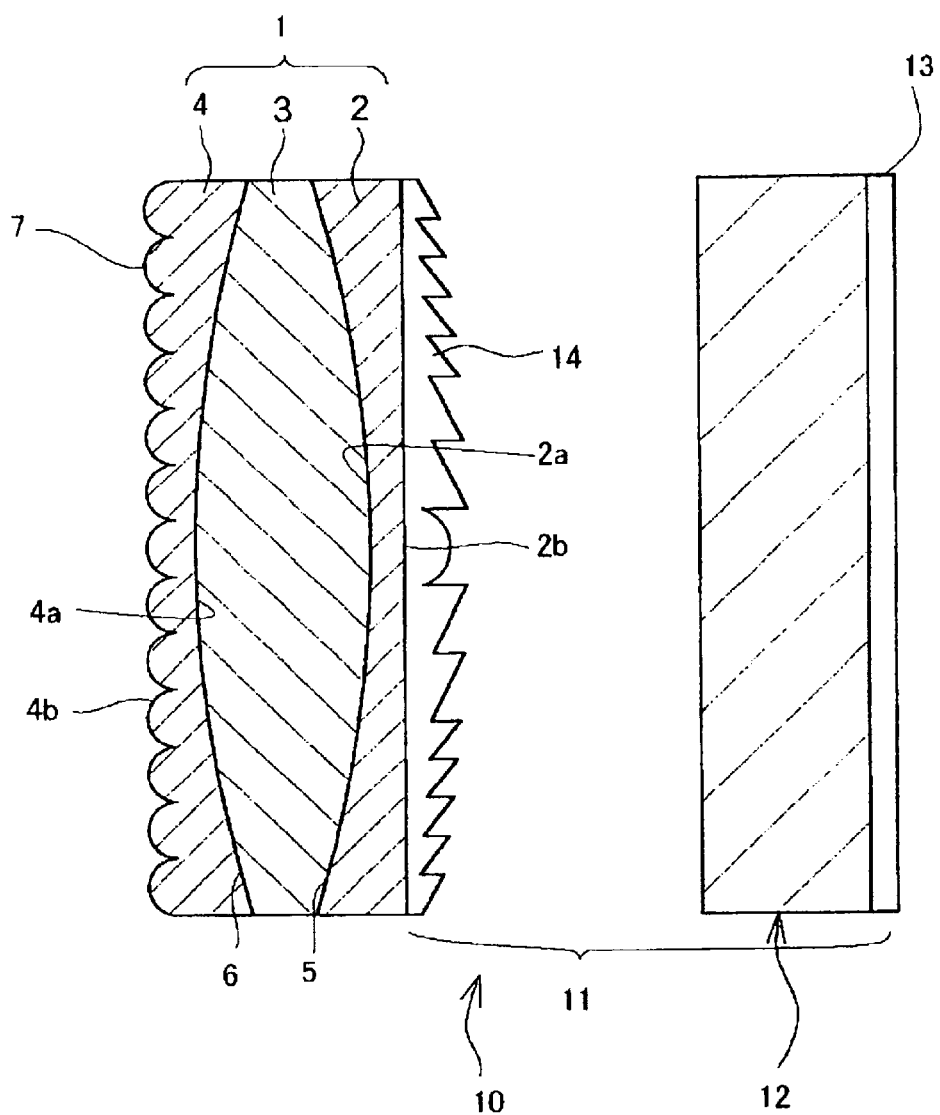
FIG. 6 is a vertical cross-sectional view taken along the line VI—VI in FIG. 5.

At least one of the surfaces of the light diffusing laminated plate 1, in other words, at least one of the second surfaces 2b and 3b of the first and second light diffusing layers 2 and 3 in the case of the embodiment shown in FIG. 2, or at least one of the second surfaces 2b and 4b of the first and third light diffusing layers 2 and 4 in the case of the embodiment shown in FIG. 3, may be provided with a lens. FIG. 4 is a cross-sectional view illustrating a light diffusing laminated plate according to a third embodiment of this invention having such a lens 7. Those parts corresponding to the component of FIG. 2 are identified with the same numerals and their description will not be repeated. In the particular embodiment shown in FIG. 4, the lens 7 is laminated on the second surface 2b of the first light diffusing layer 2. The lens 7 may be a Fresnel lens, or a lenticular lens for vertical or horizontal diffusion. The lens 7 may be laminated on the surface (as shown in FIG. 4) or directly formed in the surface (as shown in FIG. 6). When a lenticular lens or a Fresnel lens is directly formed in a surface of the light diffusing laminated plate 1, the thickness of the light diffusing laminated plate 1 varies by the unevenness on the lens surface in a strict sense. However, when the unevenness of the lens is ignored, the light diffusing laminated plate 1 has generally a constant thickness.

The light diffusing laminated plate of this invention may have a two-layer structure as shown in FIG. 2, a three-layer structure as shown in FIG. 3, or a four-or more layered structure, although not specifically illustrated, as long as it has at least one light diffusing layer containing particles of a transparent light diffusing material dispersed therein and at least one light diffusing layer containing particles of an opaque light diffusing material dispersed therein. If desired, a light diffusing laminated plate in which the thicknesses of the light diffusing layers vary in the vertical direction and a light diffusing laminated plate in which the thicknesses of the light diffusing layers vary in the horizontal direction can be laminated together to prevent a shading phenomenon in the four corners of a transmissive screen.

The light diffusing laminated plate 1 of this invention generally has a thickness T of 0.5–4 mm, preferably 1–3 mm. The thickness T herein is a total thickness of the first and second light diffusing layers 2 and 3 in the case of the embodiment of FIG. 2 and a total thickness of the first, second and third light diffusing layers 2, 3 and 4 in the case of the embodiments of FIGS. 3 and 6. The thickness of the lens 7 is not included in the thickness T.

The thickness of the first light diffusing layer 2 (the total thickness of the first and third light diffusing layers 2 and 4 in the case of the embodiment of FIG. 3; hereinafter the same applies) at the thickest point (the top or bottom portion in the embodiment shown in FIGS. 2 and 3) is 15–80%, preferably 20–50%, of the thickness T of the light diffusing laminated plate 1, while the thickness of the first light diffusing layer 2 at the thinnest point (the middle portion in the embodiment shown in FIGS. 2 and 3) is 2–30%, preferably 4–15%, of the thickness T of the light diffusing laminated plate 1. The thickness of the second light diffusing layer 3 at the thickest point (the middle portion in the embodiment shown in FIGS. 2 and 3) is 70–98%, preferably 85–96%, of the thickness T of the light diffusing laminated plate 1, while the thickness of the second light diffusing layer 3 at the thinnest point (the top or bottom portion in the embodiment shown in FIGS. 2 and 3) is 20–85%, preferably 50–80% of the thickness T of the light diffusing laminated plate. The thicknesses of the layers can be measured by coloring them and observing them with an optical microscope in a vertical or horizontal cross-section in which their thicknesses vary (YZ plane in the case of FIG. 1).

In the light diffusing laminated plate of this invention, the content of the transparent light diffusing material in each of the first and third light diffusing layers 2 and 4 is generally 0.5–10% by weight, while the content of the opaque light diffusing material in the second light diffusing layer 3 is generally 0.01–1% by weight.

In the light diffusing laminated plate of this invention, the higher the total light transmittance, the better, since a screen having the light diffusing laminated plate can be brighter. The total light transmittance is preferably at least 90% all over the light diffusing laminated plate. Also, to prevent a shading phenomenon, it is preferred that the middle area of the light diffusing laminated plate have a haze (Hc) of 15–50%, the top and bottom areas of the light diffusing laminated plate have a haze (He) of 30–70%, and the ratio He/Hc be in the range of 1.2–3.5.

The transparent light diffusing material and opaque light diffusing material are defined as follows.

Figure 17:
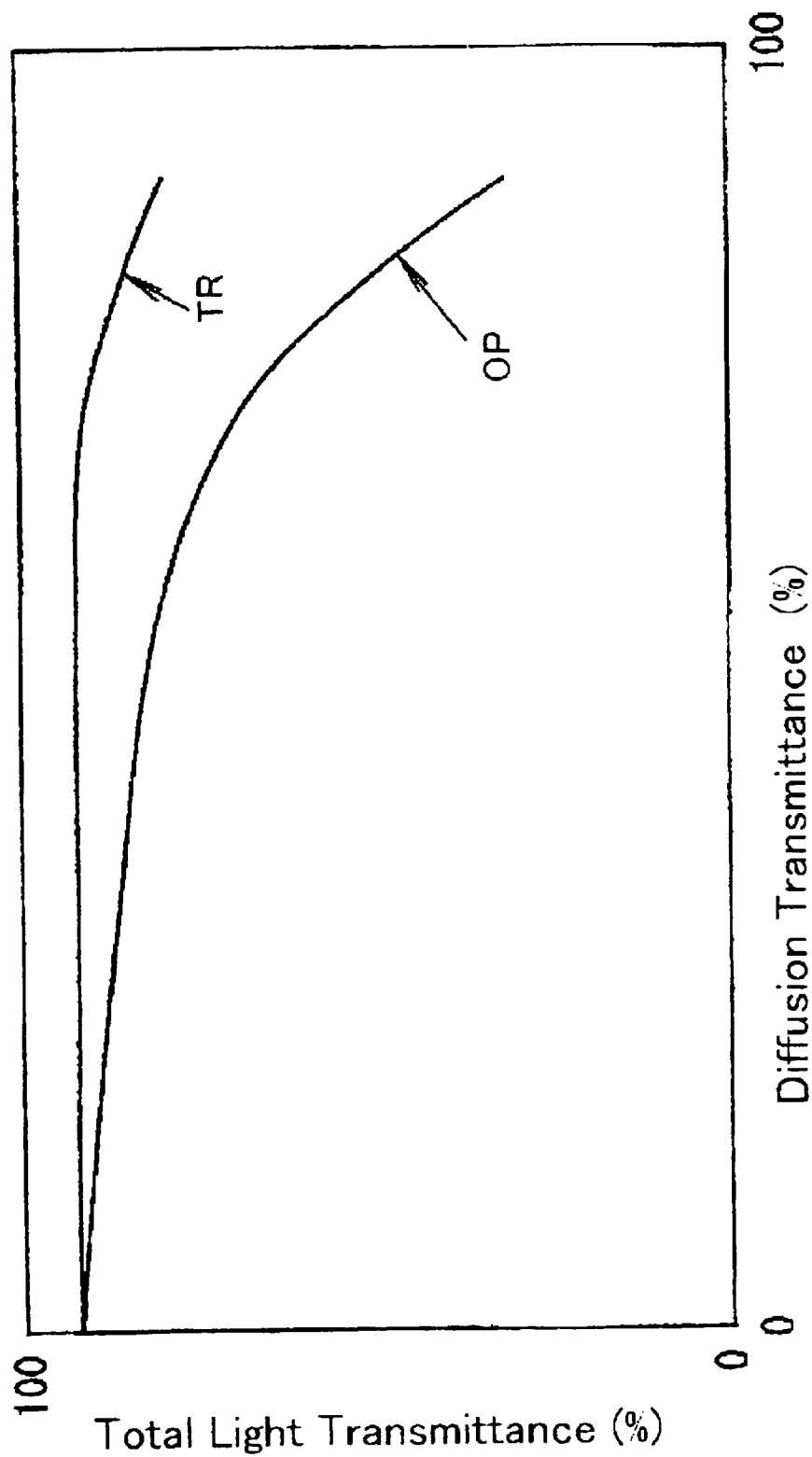
FIG. 17 is a graph showing a relationship between the total light transmittance and the diffusion transmittance of a sheet containing particles of a transparent light diffusing material dispersed therein and the relation between the total light transmittance and the diffusion transmittance of a sheet containing particles of an opaque light diffusing material.

Particles of a light diffusing material are uniformly dispersed in a matrix resin of a styrene-methyl methacrylate copolymer containing 60 mol % of methacrylate component units using an extruder, and the kneaded mixture is extruded through a T-die to form a flat sheet with a thickness of 1 mm. Similar procedures are repeated while varying the amount of the light diffusing material. Then, the total light transmittance and diffusion transmittance of each of the sheets are measured. Based on the results of the measurement, a graph with the total light transmittance on the vertical axis and the diffusion transmittance on the horizontal axis as shown in FIG. 17 is obtained. Then, the value of the total light transmittance corresponding to a diffusion light transmittance of 80% is read from the graph. When the value of the total light transmittance is 85% or higher, the light diffusing material contained in the sheets are classified as a transparent light diffusing material, and when the value of the total light transmittance is lower than 85%, the light diffusing material contained in the sheets are classified as an opaque light diffusing material.

FIG. 17 shows examples of the total light transmittance vs. diffusion transmittance curves, in which the curve TR is in the case of spherical particles of a crosslinked styrene-methyl methacrylate copolymer with an average particle size of 12 $\mu$m as a transparent light diffusing material. The total light transmittance is higher than 85% in the case of the curve TR. The curve OP is in the case of irregular shaped particles of barium sulfate with an average particle size of 2 $\mu$m as an opaque light diffusing material. The total light transmittance is lower than 85% in the case of the particles of barium sulfate.

The total light transmittance is measured according to JIS K7361-1:1997, and the haze and the diffusion transmittance are measured according to JIS K7136:2000.

Specific examples of the transparent light diffusing material include glass, an acrylic resin, a styrene resin and a silicone resin. As the acrylic resin, a polymer of an acrylic monomer having an acrylate group [$CH_2$=CR—COO—] (wherein R represents H or $CH_3$) and/or its derivatives is suitably used. Specific examples of the acrylic resin include homopolymers or copolymers of methacrylic acid: a methacrylic acid ester such as methyl methacrylate; acrylic acid; an acrylic acid ester such as methyl acrylate, ethyl acrylate or butyl acrylate; and mixtures, modification products or crosslinking products thereof. As the styrene resin, homopolymers or copolymers of styrene, and mixtures, modification products or crosslinking products thereof are suitably used. In particular, a copolymer resin of a styrene monomer with an acrylic monomer described as above is preferred, and a crosslinking product of the copolymer resin is especially preferred. The particles of the transparent light diffusing material preferably have a spherical, almost spherical, elliptical, semispherical or almost semispherical shape. The transparent light diffusing material particles generally have an average particle size of 1–100 $\mu$m, preferably 5–50 $\mu$m.

Specific examples of the opaque light diffusing material include barium sulfate, calcium carbonate, silica and aluminum hydroxide. The particles of the opaque light diffusing material may have a spherical, almost spherical, elliptical or irregular shape. Especially preferred are particles with irregular shape. The particles generally have an average particle size of 1–50 $\mu$m, preferably 1–10 $\mu$m.

The average particle size of the transparent light diffusing material and the opaque light diffusing material in this specification is the median diameter on weight basis, which can be measured with a centrifugal sedimentation particle size distribution analyzer SA-CP4L (V1.1), manufactured by Shimadzu Corporation.

As the light transmissive resin used as the matrix resin of the light diffusing laminated plate, transparent resins such as polystyrene resins; acrylic resins; polyolefin resins including cyclic polyolefin resins and olefin maleimide copolymer resins; polycarbonate resins; and polyester resins can be used. Above all, polystyrene resins, acrylic resins and polycarbonate resins are preferably used. Especially preferred is a copolymer resin of a styrene monomer with an acrylic monomer having an acrylate group [$CH_2$=CR—COO—] (wherein R represents H or $CH_3$) and/or its derivative.

The light diffusing laminated plate of this invention may be suitably produced by coextrusion. For example, a light transmissive resin and particles of a transparent light diffusing material are mixed in an extruder to obtain a first molten resin containing the particles of the light diffusing material uniformly dispersed therein. A light transmissive resin and particles of an opaque light diffusing material are mixed in another extruder to obtain a second molten resin containing the particles of the opaque light diffusing material uniformly dispersed therein. Then, the first and second molten resins are coextruded through a die to produce a coextruded laminated sheet. By cutting the laminated sheet into a specified size, the light diffusing laminated plate having the above described structure can be obtained.

To produce the light diffusing laminated plate as a coextruded laminated plate, a T-die called "multi-manifold die", for example, is suitably used. The die has a structure in which a plurality of T-dies are stacked on top of one another, As another example, a device called "combining feedblock" may be interposed between extruders and T-dies for combining molten resin streams supplied from the extruders to produce a multilayer sheet as disclosed in JP-A-S55-117639.

To change the thicknesses of the light diffusing layers, a thickness adjusting mechanism having a bolt called "choke bar" for controlling the gap of the molten resin passage is attached to the multi-manifold die or the combining feedblock. By fastening or loosening the choke bar, the thickness of the molten resin extruded can be adjusted.

The light diffusing laminated plate of the present invention is suitably used for constructing a transmissive screen for a rear projection display.

Figure 5:
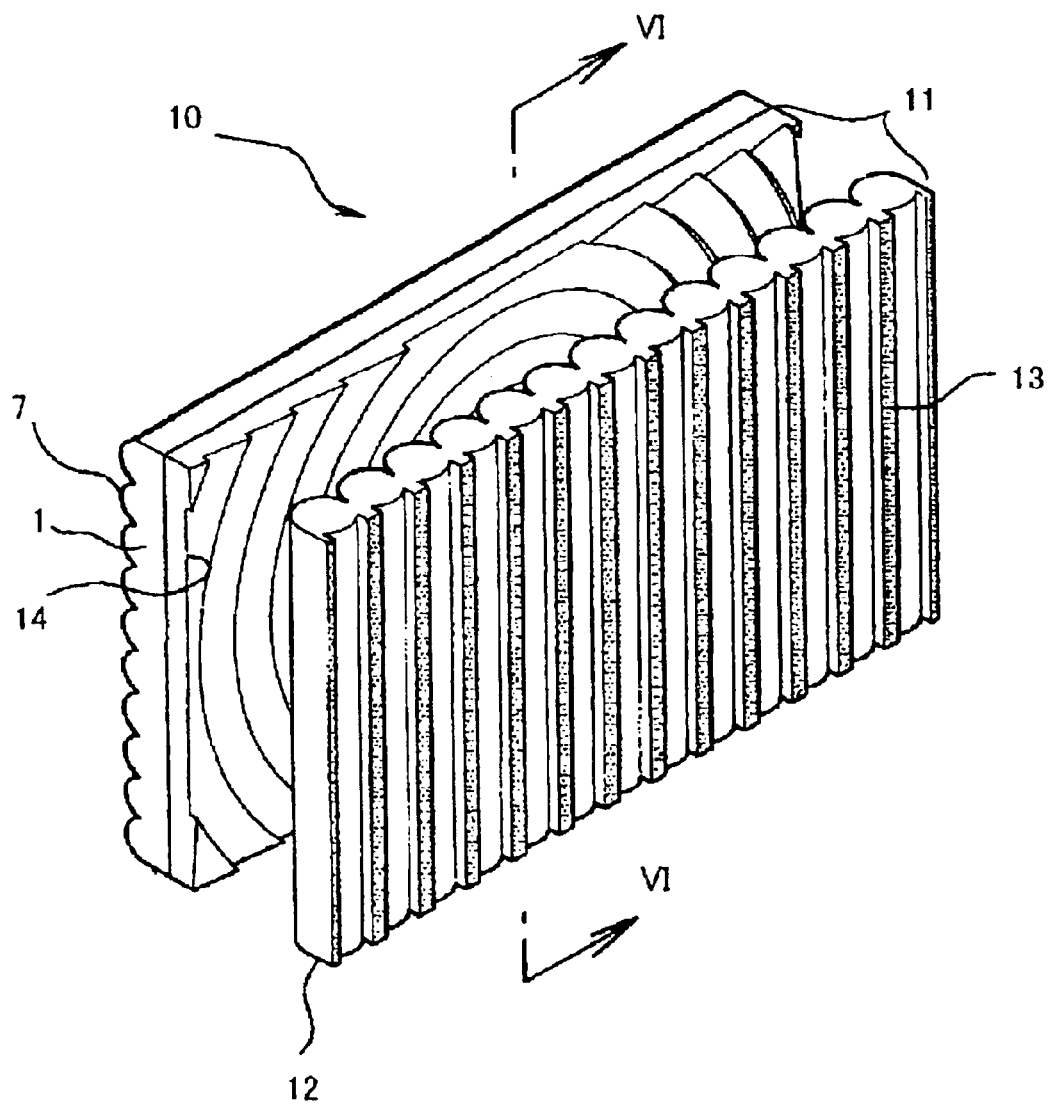
FIG. 5 is a perspective view illustrating an essential part of a transmissive screen according to one embodiment of this invention.
Figure 11A:
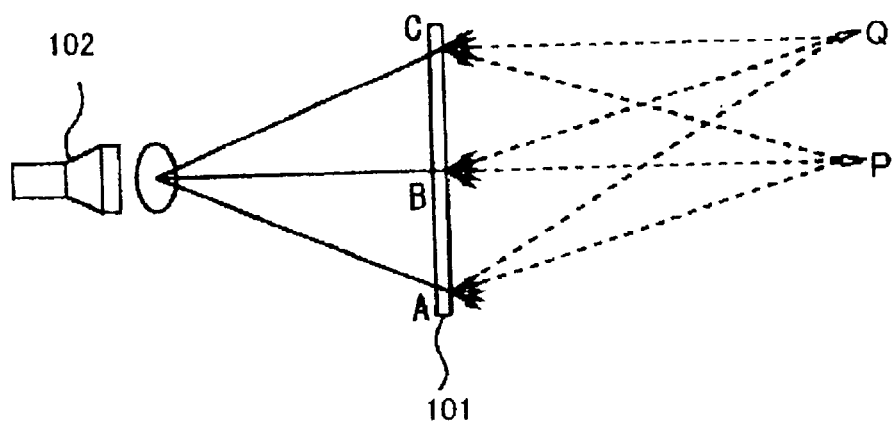
FIG. 11($a$) to FIG. 11($c$) are views for explaining a shading phenomenon which may occur on a rear projection screen.
Figure 11B:
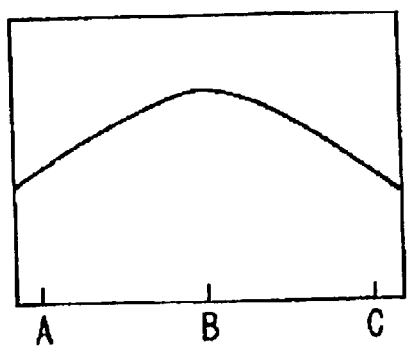
Figure 11C:
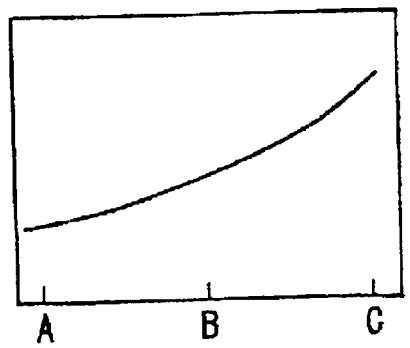

Referring to FIGS. 5 and 6, generally designated as 10 is a transmissive screen according to this invention for a rear projection display having a light image source (not shown; see FIG. 11(a)). The transmissive screen 10 has a light diffusing laminated plate 1 and a lens system 11 disposed such that a light image from the light image source can be projected through the light diffusing laminated plate 1 and the lens system 11 and displayed on the screen 10. In the example shown in FIGS. 5 and 6, the light diffusing laminated plate 1 has a three-layer structure as shown in FIG. 3, and a lenticular lens 7 is directly formed in the second surface 4b of the third light diffusing layer 4. The lens system 11 has a lenticular lens 12 for horizontal diffusion with a black stripe 13 on it located on the viewer side of the light diffusing laminated plate 1 and a Fresnel lens 14 laminated on the second surface 2b of the first light diffusing layer 2.

Figure 7:
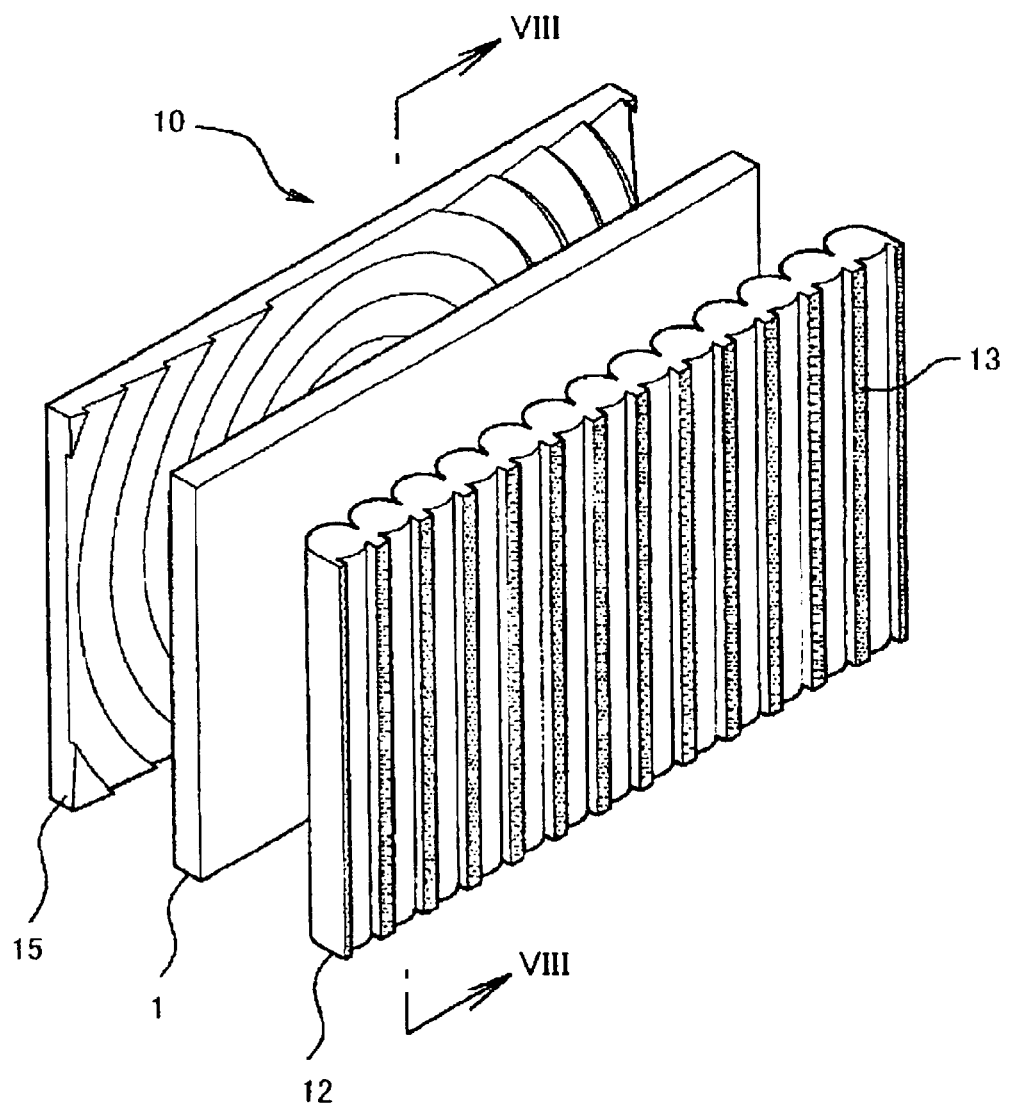
FIG. 7 is a perspective view illustrating an essential part of a transmissive screen according to another embodiment of this invention.
Figure 8:
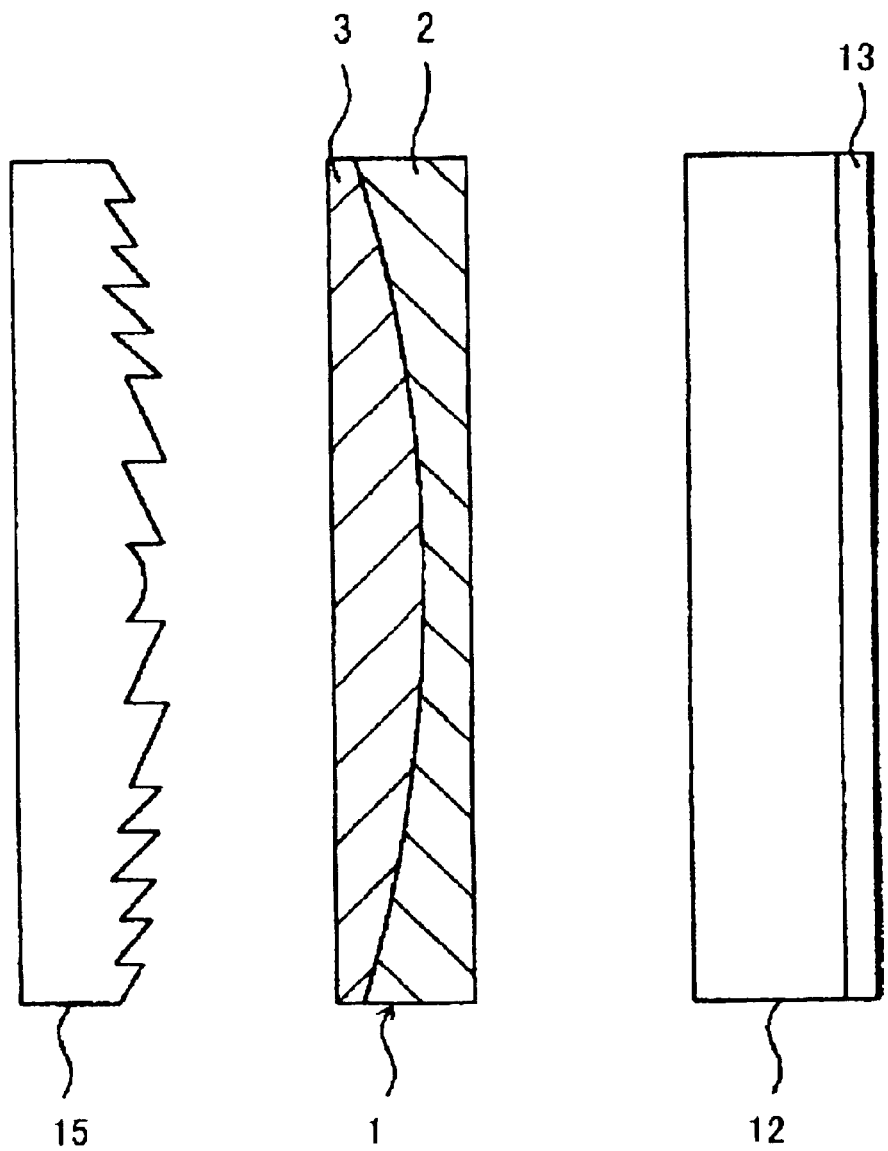
FIG. 8 is a vertical cross-sectional view taken along the line VIII—VIII in FIG. 7.

FIG. 7 is a perspective view of an essential part of a transmissive screen 10 according to another embodiment of this invention, and FIG. 8 is a cross-sectional view taken along the line VIII—VIII in FIG. 7. In this embodiment, the lens system includes a lenticular lens 12 for horizontal diffusion located on the viewer side of the light diffusing laminated plate 1 having a structure shown in FIG. 2, and a Fresnel lens 15 located on the light image source side of the light diffusing laminated plate 1.

Figure 9:
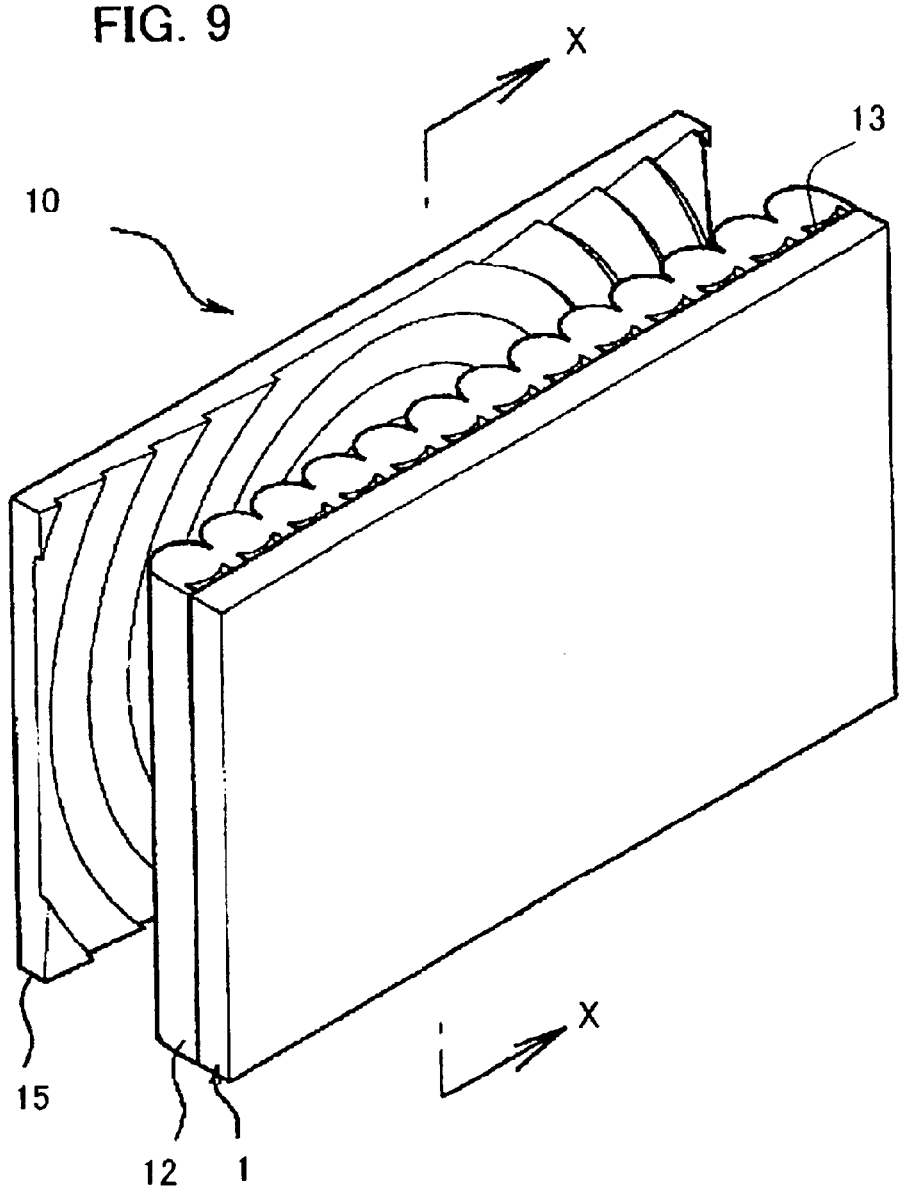
FIG. 9 is a perspective view illustrating an essential part of a transmissive screen according to a further embodiment of this invention.
Figure 10:
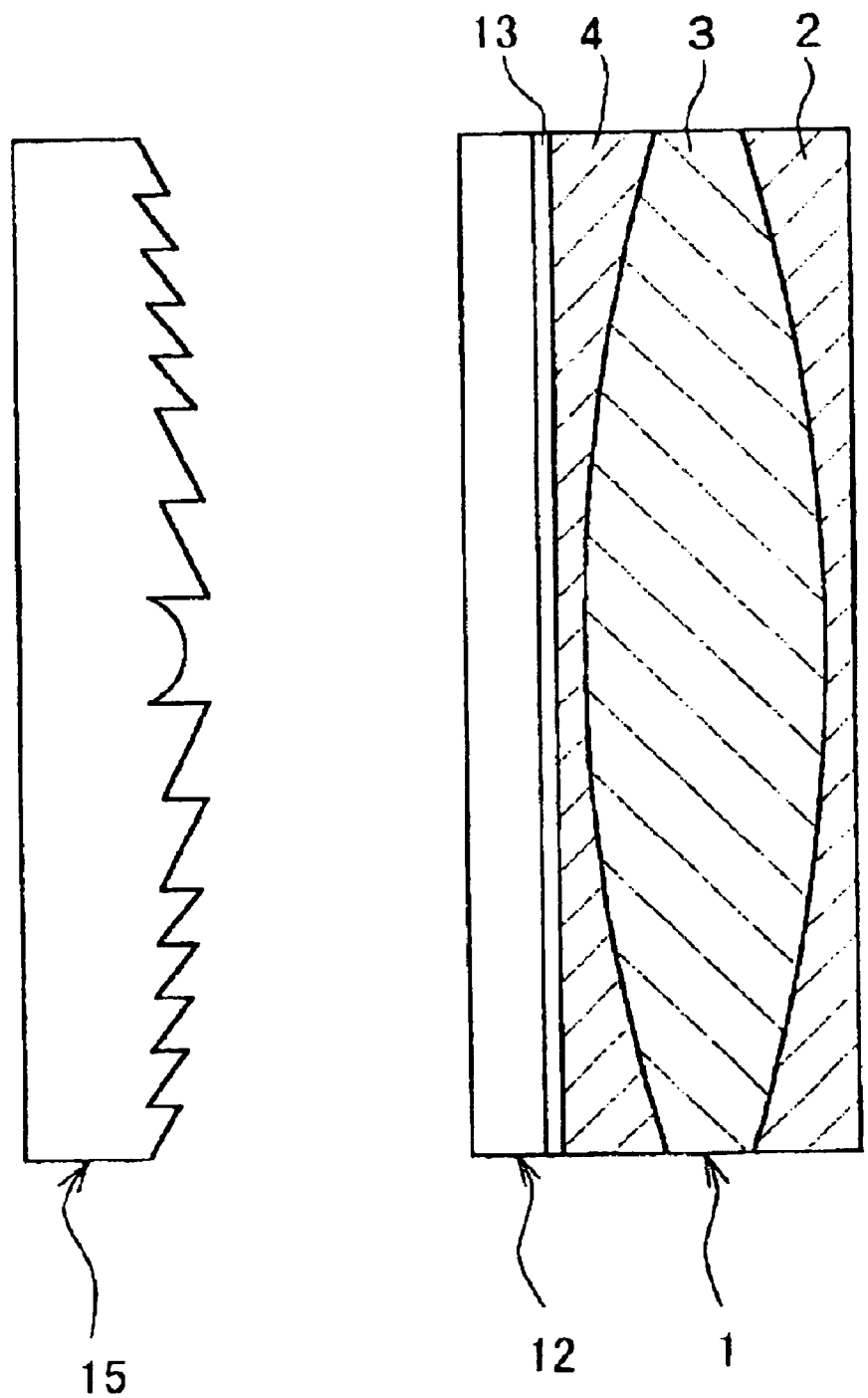
FIG. 10 is a vertical cross-sectional view taken along the line X—X in FIG. 9.

FIG. 9 is a perspective view of an essential part of a transmissive screen 10 according to a further embodiment of this invention, and FIG. 10 is a cross-sectional view taken along the line X—X in FIG. 9. In this embodiment, a lenticular lens 12 for horizontal diffusion with a black stripe 13 is laminated on the light image source side surface of the light diffusing laminate plate 1 having a structure shown in FIG. 3, and a Fresnel lens 15 is located on the light image source side of the light diffusing laminated plate 1.

Figure 16:
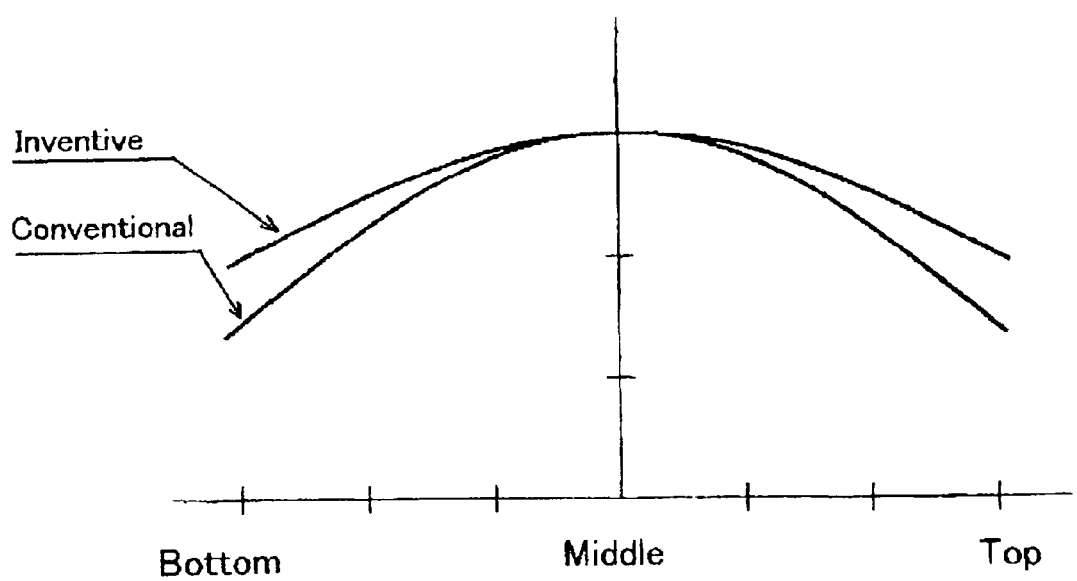
FIG. 16 shows graphs showing a relationship between the brightness of an image on the screen of a projection television and the light diffusion transmittance characteristics thereof.
Figure 16:
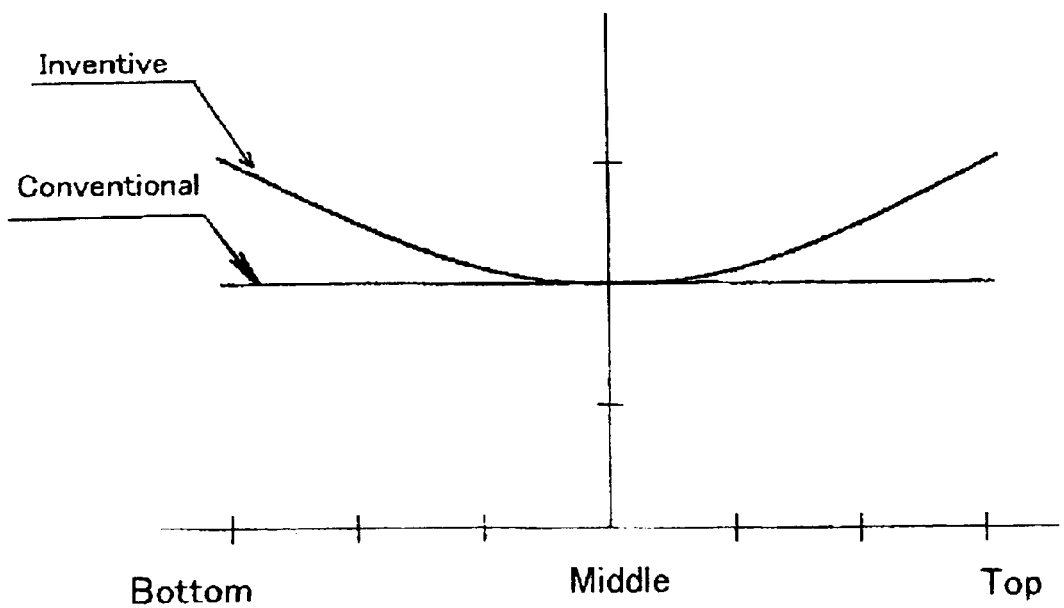

In a transmissive screen having a light diffusing laminated plate of this invention, since the amount of the transparent light diffusing material in the thickness direction is greater in the top and bottom areas than in the middle area, the light diffusing ability in the top and bottom areas is higher than that in the middle area and the light transmittance in the top and bottom areas is not significantly reduced as shown in FIG. 16, Thus, a shading phenomenon in the top and bottom areas of the transmissive screen can be prevented. Also, the amount of an opaque light diffusing material in the thickness direction is greater in the middle area than in the top and bottom areas, neither a scintillation phenomenon nor a hot band phenomenon is likely to occur in the middle area of the transmissive screen.

When the light diffusing laminated plate is used in a transmissive screen, the light diffusing laminated plate is preferably positioned such that the thicknesses of the! light diffusing layers change in the vertical direction.

The following examples will further illustrate the present invention.

Example 1

A styrene-methyl methacrylate copolymer resin containing 60 mol % of methacrylate units as a light transmissive resin and spherical particles of a crosslinked styrene-methyl methacrylate copolymer resin with an average particle size of 12 μm as a transparent light diffusing material were kneaded in an extruder with an inside diameter of 65 mm to obtain a first molten resin containing 2% by weight of particles of the transparent light diffusing material uniformly dispersed therein. A light transmissive resin of the same type as above and irregular shaped particles of barium sulfate with an average particle size of 2 μm as an opaque light diffusing material were kneaded in an extruder with an inside diameter of 120 mm to obtain a second molten resin containing 0.05% by weight of particles of the opaque light diffusing material uniformly dispersed therein. The first and second molten resins were supplied to a combining feedblock connected to each of the extruders and provided with a thickness adjusting mechanism. The combined molten resins were then co-extruded through a T-die connected to the feedblock to obtain an extruded sheet with a thickness of 1.5 mm and a width of 930 mm. The extruded sheet was then passed between polishing rolls and curving rolls for formation of a lenticular lens for vertical diffusion to form a lenticular lens in a surface of the extruded sheet. Then, the extruded sheet was cut to obtain a light diffusing laminated plate with a width of 810 mm, a length of 1050 mm, and a thickness of 1.5 mm. The light diffusing laminated plate had a three-layer structure as shown in FIG. 6.

The light diffusing laminated plate was positioned such that the lenticular lens for vertical diffusion was on the side of a light image source and the two light diffusing layers containing the transparent light diffusing material were each thick at the top and bottom, and a transparent Fresnel lens containing no light diffusing material was laminated on the viewer side surface of the light diffusing laminated plate as shown in FIG. 6. The light diffusing laminated plate was combined with a lenticular lens for horizontal diffusion with a black stripe to obtain a transmissive screen as shown in FIGS. 5 and 6.

The transmissive screen was incorporated in a 57 inch CRT projection television and images on the television monitor were observed. The images were excellent in uniformity of luminance and color tone. None of the scintillation phenomenon, hot band phenomenon and shading phenomenon occurred.

Example 2

First and second molten resins were prepared in the same manner as in Example 1. The first and second molten resins were supplied to a combining feedblock connected to each of the extruders and provided with a thickness adjusting mechanism, and then co-extruded through a T-die connected to the feedblock. The extruded sheet was passed between polishing rolls to obtain a two-layered extruded sheet with smooth surfaces. The sheet was cut to obtain a light diffusing laminated plate with a width of 810 mm, length of 1050 mm and a thickness of 1.5 mm. The light diffusing laminated plate had a structure as shown in FIG. 2 and was composed of a first layer 2 containing the transparent light diffusing material and a second layer 3 containing the opaque light diffusing material. The light diffusing laminated plate was positioned such that the first light diffusing layer was thick at the top and bottom, and a transmissive screen was constructed as shown in FIGS. 7 and 8. A transparent Fresnel lens 15 contained no light diffusing material.

The transmissive screen was incorporated in a 57 inch CRT projection television and images on the television monitor were observed. The images were excellent in uniformity of luminance and in color tone. None of the scintillation phenomenon, hot band phenomenon and shading phenomenon occurred.

Comparative Example 1

Figure 12:
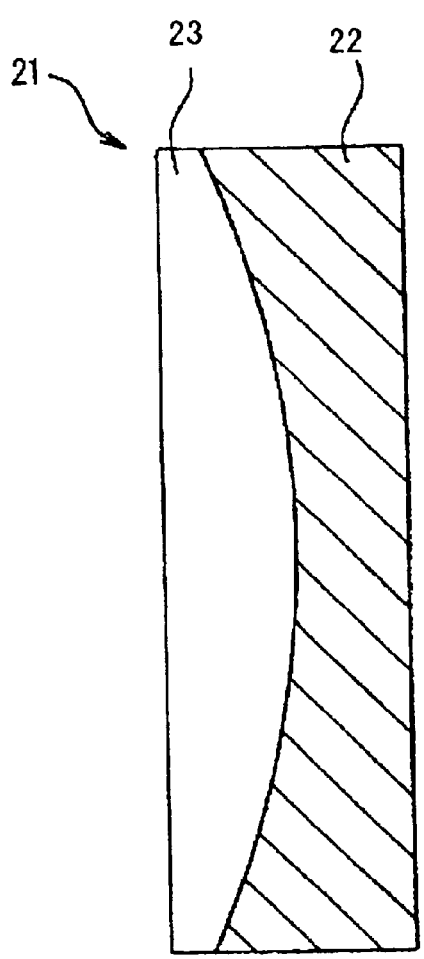
FIG. 12 is a cross-sectional view illustrating a light diffusing laminated plate used in a comparative example.

Example 2 was repeated in the same manner as described except that the opaque light diffusing material was not used at all. Thus, as shown in FIG. 12, the resulting light diffusing laminated plate 21 was composed of a first layer 22 containing the transparent light diffusing material and a second layer 23 containing no light diffusing material and consisted only of the transparent styrene-methyl methacrylate copolymer resin.

The transmissive screen was incorporated in a 57 inch CRT projection television and images on the television monitor were observed. No shading phenomenon occurred and the middle area of the monitor had sufficient luminance. However, a hot band phenomenon occurred in the middle area of the monitor.

Comparative Example 2

Figure 13:
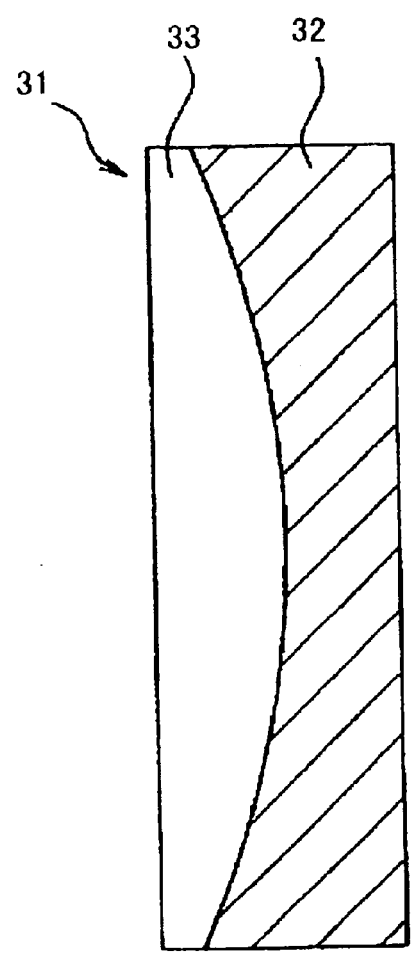
FIG. 13 is a cross-sectional view illustrating a light diffusing laminated plate used in a comparative example.

Comparative Example 1 was repeated in the same manner as described except that the transparent light diffusing material in the first layer 22 was replaced by the opaque light diffusing material. Thus, as shown in FIG. 13, the resulting light diffusing laminated plate 31 was composed of a first layer 32 containing the opaque light diffusing material and a second layer 33 containing no light diffusing material and consisted only of the transparent styrene-methyl methacrylate copolymer resin.

The transmissive screen was incorporated in a 57 inch CRT projection television and images on the television monitor were observed. The luminance was low all over the monitor and the entire monitor was dark. A shading phenomenon occurred at the top and bottom areas of the monitor.

Example 3

A three-layer structure light diffusing laminated plate having a structure shown in FIG. 3 was produced in the same manner as described in Example 1 except that the thickness profile of the first and third light diffusing layers was changed and that no lenticular lens was formed on the surface of the third light diffusing layer. Using the light diffusing laminated plate, a transmissive screen was constructed as shown in FIG. 7. A transparent Fresnel lens containing no light diffusing material was used. The transmissive screen was incorporated in a 60 inch LCD projection television and images on the television monitor were observed. The images were excellent in uniformity of luminance and free from a scintillation phenomenon.

Samples were cut off from the top, middle, bottom and intermediate areas of the light diffusing laminated plates produced in the above Examples and Comparative examples and measured for the total light transmittance, diffusion transmittance according to JIS K7361-1:1997 and haze according to JIS K7136:2000 with an integrating sphere turbidimeter (model NDH2000 manufactured by Nippon Denshoku Kogyo K.K.). The results were summarized in Table 1.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

TABLE 1

|  |  | Example | | | Comparative Example | |
|---|---|---|---|---|---|---|
|  |  | 1 | 2 | 3 | 1 | 2 |
| Total light transmittance (%) | Middle area | 92 | 92 | 91 | 90 | 89 |
|  | Top and bottom areas | 91 | 91 | 90 | 91 | 87 |
| Diffusion transmittance (%) | Middle area | 28 | 29 | 50 | 24 | 27 |
|  | Intermediate area*² | 36 | 37 | 56 | 34 | 35 |
|  | Top and bottom areas | 45 | 46 | 63 | 44 | 43 |
| Haze (%) | Middle area | 30 | 32 | 55 | 27 | 30 |
|  | Top and bottom areas | 50 | 51 | 70 | 48 | 50 |
| Thickness of layer containing transparent light diffusing material (mm) | Middle area | 0.10 | 0.10 | 0.26 | 0.10 | 0.10* |
|  | Intermediate area*² | 0.16 | 0.16 | 0.32 | 0.16 | 0.13* |
|  | Top and bottom areas | 0.40 | 0.40 | 0.50 | 0.40 | 0.20* |

*Thickness of the layer containing the opaque light diffusing material.
*²Thickness at the points spaced apart from the top and bottom ends a distance equal to ¼ of the height (vertical length) of the light diffusing laminated plate.

What is claimed is:

1. A light diffusing laminated plate, comprising:
   a first light diffusing layer of a light transmissive resin containing particles of a transparent light diffusing material dispersed therein, said first light diffusing layer having a substantially uniform cross-section in one direction and a first surface concave in said cross-section; and
   a second light diffusing layer of a light transmissive resin containing particles of an opaque light diffusing material dispersed therein, said second light diffusing layer having a substantially uniform cross-section in one direction and a first surface convex in said cross-section and coinciding with said first surface of said first light diffusing layer,
   wherein said first and second light diffusing layers are laminated together such that said first surface of said first light diffusing layer is in face to face contact with said first surface of said second light diffusing layer to form a curved interface therebetween.

2. A light diffusing laminated plate as claimed in claim 1, wherein said transparent light diffusing material is at least one substance selected from the group consisting of glass, acrylic resins, styrene resins and silicone resins, and said opaque light diffusing material is at least one substance selected from the group consisting of barium sulfate, calcium carbonate, silica, and aluminum hydroxide.

3. A light diffusing laminated plate as claimed in claim 1, further comprising a third light diffusing layer of a light transmissive resin containing particles of a transparent light diffusing material dispersed therein, said third light diffusing layer having a substantially uniform cross-section in one direction and a first surface concave in cross-section;

wherein said second light diffusing layer has a second surface opposite to said first surface thereof, said second surface of said second light diffusing layer being convex in cross-section and coinciding with said first surface of said third light diffusing layer; and wherein said third and second light diffusing layers are laminated together such that said first surface of said third light diffusing layer is in face to face contact with said second surface of said second light diffusing layer to form a curved interface therebetween.

4. A light diffusing laminated plate as claimed in claim 3, wherein said first light diffusing layer has a second surface opposite to said first surface thereof, wherein said third light diffusing layer has a second surface opposite to said first surface thereof, and wherein at least one of said second surfaces of said first and third light diffusing layers has a lenticular lens.

5. A light diffusing laminated plate as claimed in claim 3, wherein said first light diffusing layer has a second surface opposite to said first surface thereof, wherein said third light diffusing layer has a second surface opposite to said first surface thereof, and wherein at least one of said second surfaces of said first and third light diffusing layers has a Fresnel lens.

6. A light diffusing laminated plate as claimed in claim 3, wherein said first light diffusing layer has a second surface opposite to said first surface thereof, wherein said third light diffusing layer has a second surface opposite to said first surface thereof, and wherein one of said second surfaces of said first and third light diffusing layers has a Fresnel lens and the other second surface has a lenticular lens.

7. A transmissive screen for a rear projection display device having a light image source, comprising a light diffusing laminated plate according to claim 3 and a lens system disposed such that a light image from said source is projected through said light diffusing laminated plate and said lens system and displayed on said screen.

8. A light diffusing laminated plate as claimed in claim 1, wherein said first light diffusing layer has a second surface opposite to said first surface thereof, wherein said second light diffusing layer has a second surface opposite to said first surface thereof, and wherein at least one of said second surfaces of said first and second light diffusing layers has a lenticular lens.

9. A light diffusing laminated plate as claimed in claim 1, wherein said first light diffusing layer has a second surface opposite to said first surface thereof, wherein said second light diffusing layer has a second surface opposite to said first surface thereof, and wherein at least one of said second surfaces of said first and second light diffusing layers has a Fresnel lens.

10. A light diffusing laminated plate as claimed in claim 1, wherein said first light diffusing layer has a second surface opposite to said first surface thereof, wherein said second light diffusing layer has a second surface opposite to said first surface thereof, and wherein one of said second surfaces of said first and second light diffusing layers has a Fresnel lens and the other second surface has a lenticular lens.

11. A transmissive screen for a rear projection display device having a light image source, comprising a light diffusing laminated plate according to claim 1 and a lens system disposed such that a light image from said source is projected through said light diffusing laminated plate and said lens system and displayed on said screen.

* * * * *